United States Patent
Kubo et al.

(10) Patent No.: US 9,923,228 B2
(45) Date of Patent: Mar. 20, 2018

(54) FUEL CELL

(71) Applicant: TOYOTA JIDOSHA KABUSHIKI KAISHA, Toyota-shi, Aichi-ken (JP)

(72) Inventors: Hideki Kubo, Seto (JP); Hiroki Okabe, Okazaki (JP); Takashi Kondo, Nagoya (JP); Atsushi Ida, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/110,807

(22) PCT Filed: Jan. 6, 2015

(86) PCT No.: PCT/IB2015/000060
§ 371 (c)(1),
(2) Date: Jul. 11, 2016

(87) PCT Pub. No.: WO2015/107418
PCT Pub. Date: Jul. 23, 2015

(65) Prior Publication Data
US 2016/0329593 A1 Nov. 10, 2016

(30) Foreign Application Priority Data
Jan. 15, 2014 (JP) ................................ 2014-004942

(51) Int. Cl.
*H01M 8/02* (2016.01)
*H01M 8/2483* (2016.01)
*H01M 8/241* (2016.01)
*H01M 8/0271* (2016.01)
*H01M 8/0258* (2016.01)
*H01M 8/242* (2016.01)
*H01M 8/2465* (2016.01)
(Continued)

(52) U.S. Cl.
CPC ....... *H01M 8/2483* (2016.02); *H01M 8/0232* (2013.01); *H01M 8/0245* (2013.01);
(Continued)

(58) Field of Classification Search
CPC .. H01M 8/2483; H01M 8/0258; H01M 8/241; H01M 8/0271; H01M 8/1004
See application file for complete search history.

(56) References Cited

U.S. PATENT DOCUMENTS

| | | | |
|---|---|---|---|
| 2008/0233447 A1* | 9/2008 | Gemba | H01M 8/0258 429/433 |
| 2008/0305384 A1* | 12/2008 | Kawashima | H01M 8/0273 429/433 |

(Continued)

FOREIGN PATENT DOCUMENTS

| | | |
|---|---|---|
| JP | 2007-323893 | 12/2007 |
| JP | 2012-123949 | 6/2012 |

*Primary Examiner* — Stewart A Fraser
(74) *Attorney, Agent, or Firm* — Finnegan, Henderson, Farabow, Garrett & Dunner, LLP

(57) ABSTRACT

A fuel cell is formed by laminating a plurality of power generating units. The power generating unit includes: a membrane electrode gas diffusion layer assembly; a sealing portion disposed along its outer circumference; a porous body flow path in which oxidant gas supplied to a cathode-side catalytic layer flows; a shielding plate provided between the sealing portion and the porous body flow path; and first, second separator plates configured to sandwich the membrane electrode gas diffusion layer assembly and the porous body flow path therebetween. The shielding plate, the porous body flow path, and the first separator plate making contact with the porous body flow path project into the oxidant exhaust gas discharge manifold determined by the sealing portion.

5 Claims, 11 Drawing Sheets

(51) Int. Cl.
  H01M 8/0232    (2016.01)
  H01M 8/0245    (2016.01)
  H01M 8/0247    (2016.01)
  H01M 8/0273    (2016.01)
  H01M 8/0276    (2016.01)
  H01M 8/04291   (2016.01)
  H01M 8/1007    (2016.01)
  H01M 8/2457    (2016.01)
  H01M 8/1004    (2016.01)
  H01M 8/1018    (2016.01)

(52) U.S. Cl.
  CPC ....... *H01M 8/0247* (2013.01); *H01M 8/0258* (2013.01); *H01M 8/0271* (2013.01); *H01M 8/0273* (2013.01); *H01M 8/0276* (2013.01); *H01M 8/04291* (2013.01); *H01M 8/1004* (2013.01); *H01M 8/1007* (2016.02); *H01M 8/241* (2013.01); *H01M 8/242* (2013.01); *H01M 8/2457* (2016.02); *H01M 8/2465* (2013.01); *H01M 2008/1095* (2013.01); *H01M 2300/0082* (2013.01)

(56) References Cited

U.S. PATENT DOCUMENTS

| | | | |
|---|---|---|---|
| 2010/0035110 A1* | 2/2010 | Lundblad | H01M 8/0247 429/483 |
| 2010/0209798 A1* | 8/2010 | Nunokawa | H01M 8/0206 429/455 |
| 2013/0260281 A1* | 10/2013 | Sato | H01M 8/006 429/482 |

* cited by examiner

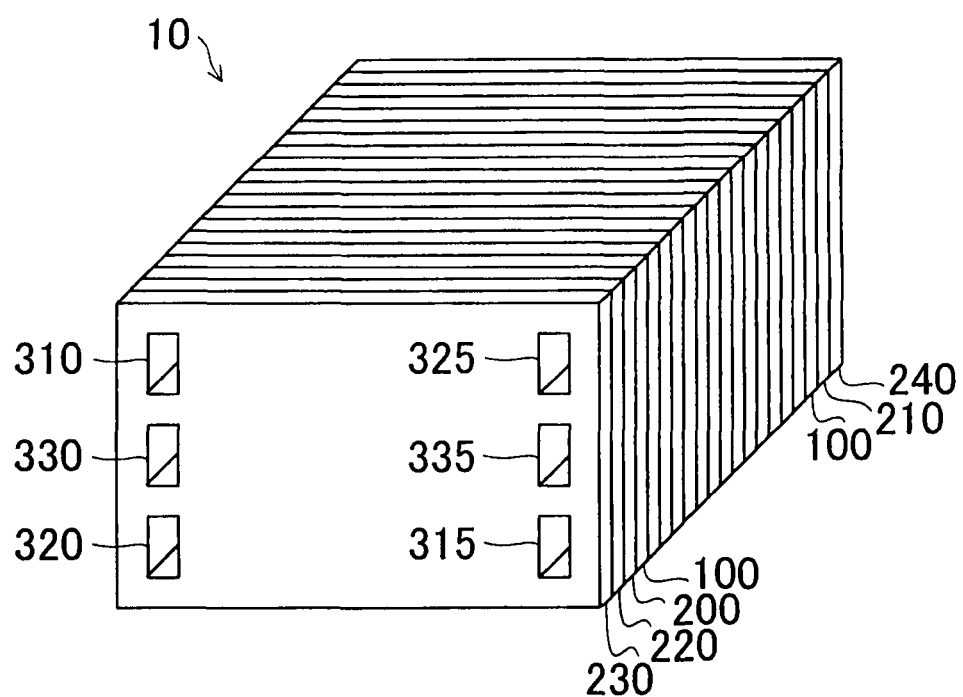
F I G . 1

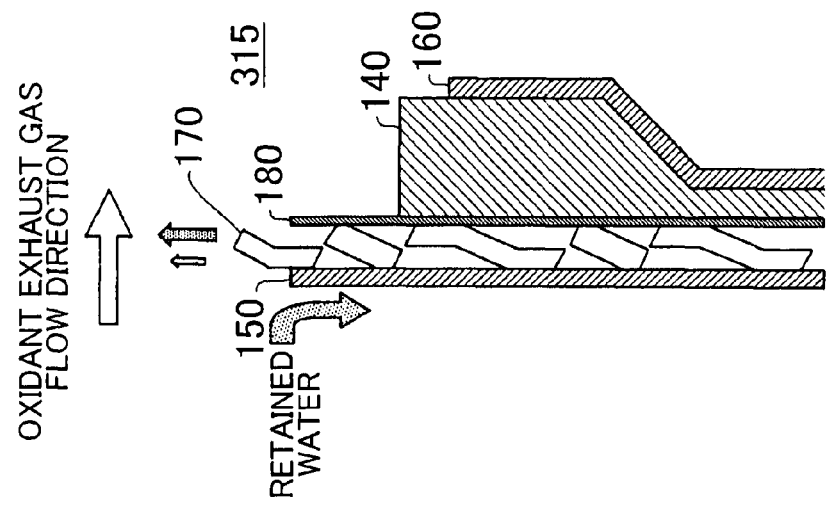
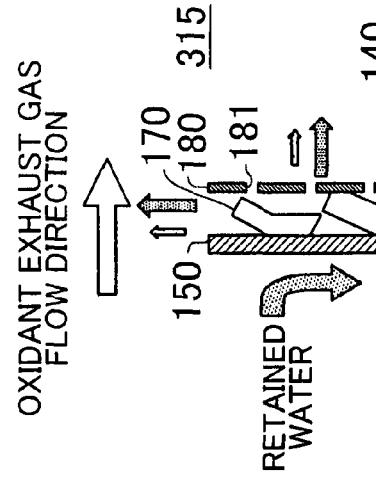
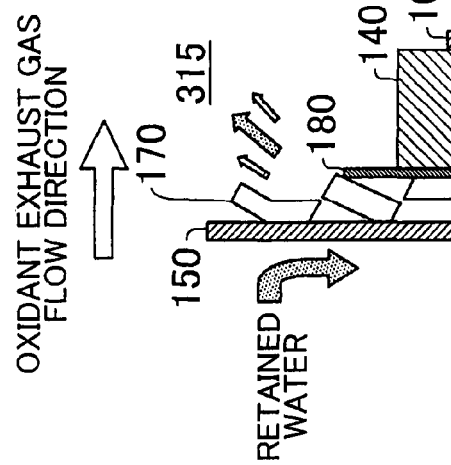

FUEL CELL

CROSS-REFERENCE TO RELATED APPLICATIONS

This application is a national phase application of International Application No. PCT/IB2015/000060, filed Jan. 6, 2015, and claims the priority of Japanese Application No. 2014-004942, filed Jan. 15, 2014, the content of both of which is incorporated herein by reference.

BACKGROUND OF THE INVENTION

1. Field of the Invention

The present invention relates to a fuel cell using a porous body as a reactant gas passage.

2. Description of Related Art

Japanese Patent Application Publication No. 2012-123949 (JP 2012-123949 A) describes a fuel cell configured such that an expanded metal and a sealing plate project into a supply manifold of a cathode.

On a cathode gas discharge side, water generated due to reaction is discharged. However, JP 2012-123949 A does not sufficiently make a study of a structure to efficiently discharge water in a discharge side manifold.

SUMMARY OF THE INVENTION

An aspect of the present invention relates to a fuel cell formed by laminating a plurality of power generating units. In the fuel cell, each of the power generating units includes: a membrane electrode gas diffusion layer assembly including an electrolyte membrane, an anode-side catalytic layer, and a cathode-side catalytic layer such that the electrolyte membrane is sandwiched between the anode-side catalytic layer and the cathode-side catalytic layer; a sealing portion disposed along an outer circumference of the membrane electrode gas diffusion layer assembly; a porous body flow path disposed so as to be opposed to the cathode-side catalytic layer and in which oxidant gas supplied to the cathode-side catalytic layer flows; a shielding plate provided between the sealing portion and the porous body flow path; and first, second separator plates configured to sandwich the membrane electrode gas diffusion layer assembly and the porous body flow path therebetween. The sealing portion and the first, second separator plates have openings at positions corresponding to each other. The openings communicate with each other when the plurality of power generating units is laminated, so as to form an oxidant exhaust gas discharge manifold through which oxidant exhaust gas is discharged from the porous body flow path. The first separator plate makes contact with the porous body flow path. The shielding plate, the porous body flow path, and the first separator plate making contact with the porous body flow path project into the oxidant exhaust gas discharge manifold defined by the sealing portion. According to the fuel cell, the shielding plate, the porous body flow path, and the first separator plate project into the oxidant exhaust gas discharge manifold defined by the sealing portion. Accordingly, generated water generated due to reaction of the fuel cell is easily discharged into the oxidant exhaust gas discharge manifold, thereby making it possible to restrain reverse flow of water from the oxidant exhaust gas discharge manifold to the porous body flow path.

Both surfaces of that part of the porous body flow path which project into the oxidant exhaust gas discharge manifold may be covered with the shielding plate and the first separator plate. In such a configuration, since both surfaces of the porous body flow path are covered with the shielding plate and the first separator plate, it is possible to restrain reverse flow of the generated water from an area thus covered.

One of the shielding plate and the first separator plate which is disposed in a downstream in a flow direction of the oxidant exhaust gas in the oxidant exhaust gas discharge manifold may have a smaller projection amount to project into the oxidant exhaust gas discharge manifold, than the other one thereof which is disposed in an upstream in the flow direction. The generated water discharged to the oxidant exhaust gas discharge manifold flows from the upstream to the downstream. In such a configuration, since an upstream side of the porous body flow path is covered, the generated water is hard to flow backward to the porous body flow path.

The porous body flow path may project into the oxidant exhaust gas discharge manifold more than the shielding plate and the first separator plate. With such a configuration, the generated water is easily discharged from a projecting portion of the porous body.

One of the shielding plate and the first separator plate which is disposed in the downstream in the flow direction of the oxidant exhaust gas in the oxidant exhaust gas discharge manifold may include holes or slits configured to communicate the oxidant exhaust gas discharge manifold with the porous body flow path. With such a configuration, the generated water can be discharged from the holes or the slits.

Note that the present invention can be realized in various forms. For example, the present invention is achievable in a generated water drainage structure of a fuel cell, and the like forms, other than the fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an explanatory view schematically illustrating an appearance of a fuel cell;

FIGS. 11A to 11C are explanatory views showing a part of a modification of the present embodiment.

DETAILED DESCRIPTION OF EMBODIMENTS

First Embodiment

Figure 2:
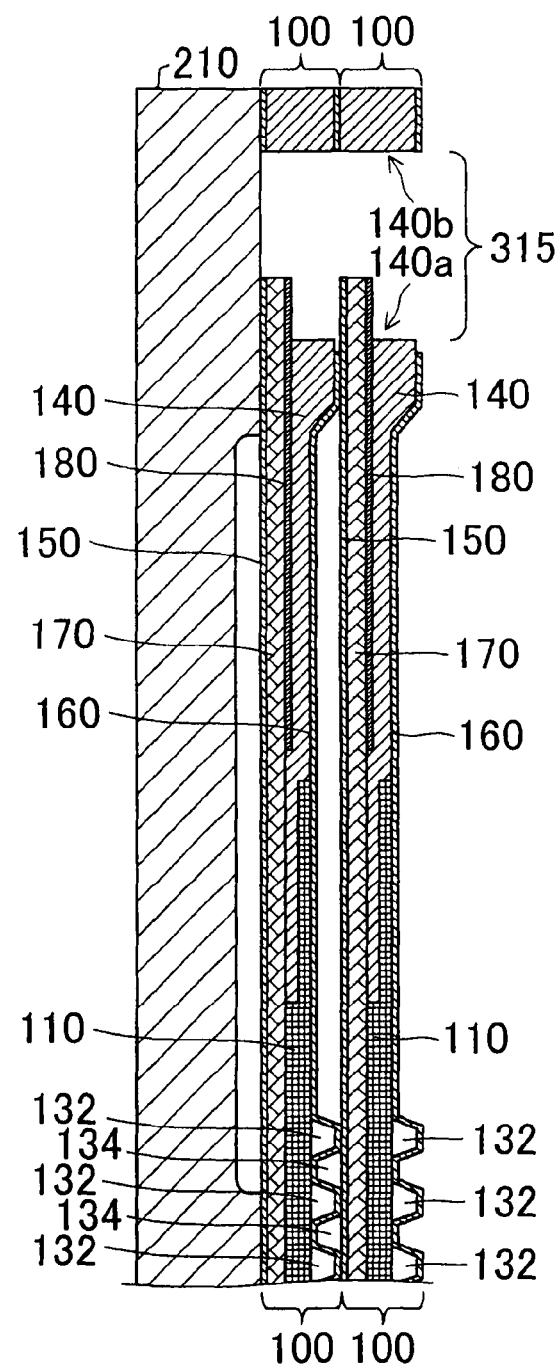
FIG. 2 is a sectional view schematically illustrating near an oxidant exhaust gas discharge manifold in the power generating units provided closer to a terminal plate.

FIG. 1 is an explanatory view schematically illustrating an appearance of a fuel cell. The fuel cell 10 includes power generating units 100, terminal plates 200, 210, an insulation plate 220, and end plates 230, 240. A plurality of power generating units 100 is provided in a laminated manner. The terminal plates 200, 210 are placed on respective sides of the power generating units 100 thus laminated, and are used to take out a voltage and a current from the power generating units 100. The insulation plate 220 is placed outside the terminal plate 200. Depending on a fixed part to a body, the insulation plate may be placed outside the terminal plate 210. The end plates 230, 240 are placed on respective sides of the fuel cell 10 so as to fasten the power generating units 100, the terminal plates 200, 210, and the insulation plate 220.

The fuel cell 10 is configured such that the power generating units 100, the terminal plate 200, the insulation plate 220, and the end plate 230 each have a plurality of openings, and corresponding openings communicate with each other so as to from manifolds 310, 315, 320, 325, 330, 335. The manifold 310 is used to supply oxidant gas to the power generating units 100, so the manifold 310 is also referred to as an oxidant gas supply manifold 310. Hereinafter, from the viewpoint of respective roles, the manifolds 315, 320, 325, 330, 335 are respectively referred to as an "oxidant exhaust gas discharge manifold 315," a "fuel gas supply manifold 320," a "fuel exhaust gas discharge manifold 325," a "refrigerant supply manifold 330," and a "refrigerant discharge manifold 335."

FIG. 2 is a sectional view schematically illustrating near the oxidant exhaust gas discharge manifold 315 in the power generating units 100 provided closer to the terminal plate 210. The power generating units 100 each includes a membrane electrode gas diffusion layer assembly 110 (hereinafter referred to as "MEGA 110"), a frame 140, a cathode-side separator plate 150, an anode-side separator plate 160, a porous body flow path 170, and a shielding plate 180. A configuration of the MEGA 110 will be described later.

The frame 140 is a member for supporting the MEGA 110 from its outer edge, and is made of resin. The frame 140 seals leakage of oxidant gas, fuel gas, and refrigerant together with the cathode-side separator plate 150 and the anode-side separator plate 160, so that the frame 140 is also referred to as a sealing portion. The shielding plate 180 is placed on a cathode side of the frame 140. The shielding plate 180 is a metal plate, and partially projects into the oxidant exhaust gas discharge manifold 315. Note that, in the present embodiment, the cathode-side separator plate 150, the anode-side separator plate 160, and the frame 140 have different lengths, so that an end (a bottom end in FIG. 2) of the oxidant exhaust gas discharge manifold 315 is determined by an end surface 140a of the frame 140. In consideration of a manufacture variation, burr, or the like of the frame 140, the end of the oxidant exhaust gas discharge manifold 315 may be determined by a mean position of the end surface 140a of the frame 140. Note that end positions of an opposite end surface 140b of the frame 140, the cathode-side separator plate 150, and the anode-side separator plate 160 are the same position in an up-down direction in the figure, so the other end (an upper end in FIG. 2) of the oxidant exhaust gas discharge manifold 315 may be determined by any of the opposite end surface 140b of the frame 140, and ends of the cathode-side separator plate 150 and the anode-side separator plate 160. The porous body flow path 170 is placed on cathode sides of the MEGA 110, the frame 140, and the shielding plate 180. The porous body flow path 170 is a flow path to flow oxidant gas therethrough, and is made of expanded metal. Instead of expanded metal, the porous body flow path 170 may be made of other types of metal porous bodies. The porous body flow path 170 projects to the same position as the shielding plate 180 in the oxidant exhaust gas discharge manifold 315. Note that, in FIG. 2, projection amounts of the cathode-side separator plate 150, the porous body flow path 170, and the shielding plate 180 are shown schematically.

The cathode-side separator plate 150 is placed on that side of the porous body flow path 170 which is adjacent to the power generating unit 100 or to the terminal plate 210. The cathode-side separator plate 150 is a metal plate, and partially projects into the oxidant exhaust gas discharge manifold 315. The anode-side separator plate 160 is placed on those surfaces of the MEGA 110 and the frame 140 which are opposite to the porous body flow path 170. The anode-side separator plate 160 is a metal plate having an irregular shape. The anode-side separator plate 160 does not project into the oxidant exhaust gas discharge manifold 315. A fuel gas flow path 132 is formed between the anode-side separator plate 160 and the MEGA 110, and a refrigerant passage is formed between the anode-side separator plate 160 and the cathode-side separator plate 150.

Figure 3:
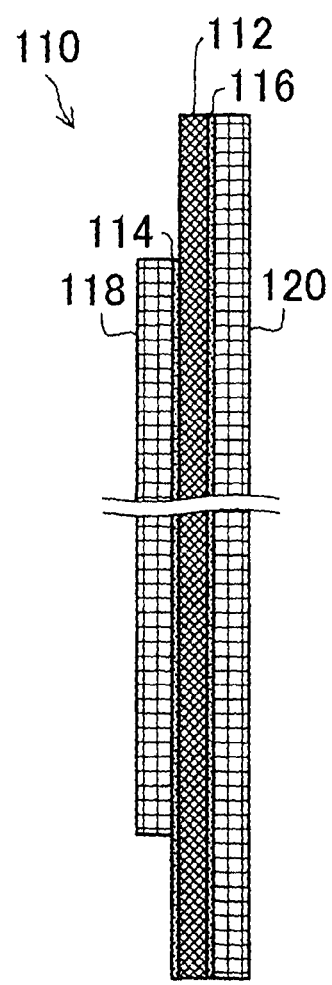
FIG. 3 is an explanatory view illustrating a configuration of a membrane electrode gas diffusion layer assembly (MEGA)

FIG. 3 is an explanatory view illustrating a configuration of the membrane electrode gas diffusion layer assembly 110 (MEGA 110). The MEGA 110 includes an electrolyte membrane 112, a cathode-side catalytic layer 114, an anode-side catalytic layer 116, a cathode-side gas diffusion layer 118, and an anode-side gas diffusion layer 120. The electrolyte membrane 112 is an electrolyte membrane having proton conductivity, and fluorinated electrolyte resin (ion exchange resin) such as perfluorocarbon sulfonic acid polymer is used, for example.

The cathode-side catalytic layer 114 and the anode-side catalytic layer 116 have carbon carrying catalyst (e.g., platinum). In the present embodiment, the anode-side catalytic layer 116 is applied to all over a first surface of the electrolyte membrane 112, but the cathode-side catalytic layer 114 is applied only to a partial region (power generation region) of a second surface of the electrolyte membrane 112. The reason for this is as follows: the anode-side catalytic layer 116 may have a less catalyst amount per unit area than the cathode-side catalytic layer 114 (typically not more than a half of the catalyst amount per unit area of the cathode-side catalytic layer 114, e.g., about one-third thereof), so even if the catalyst is applied to all over the first surface of the electrolyte membrane 112, this does not cause excessive waste, and an application step can be performed easily.

The cathode-side gas diffusion layer 118 is placed on the cathode-side catalytic layer 114, and the anode-side gas diffusion layer 120 is placed on the anode-side catalytic layer 116. The cathode-side gas diffusion layer 118 and the anode-side gas diffusion layer 120 are made of carbon paper. However, they may be made of a carbon nonwoven fabric instead of the carbon paper.

Figure 4:
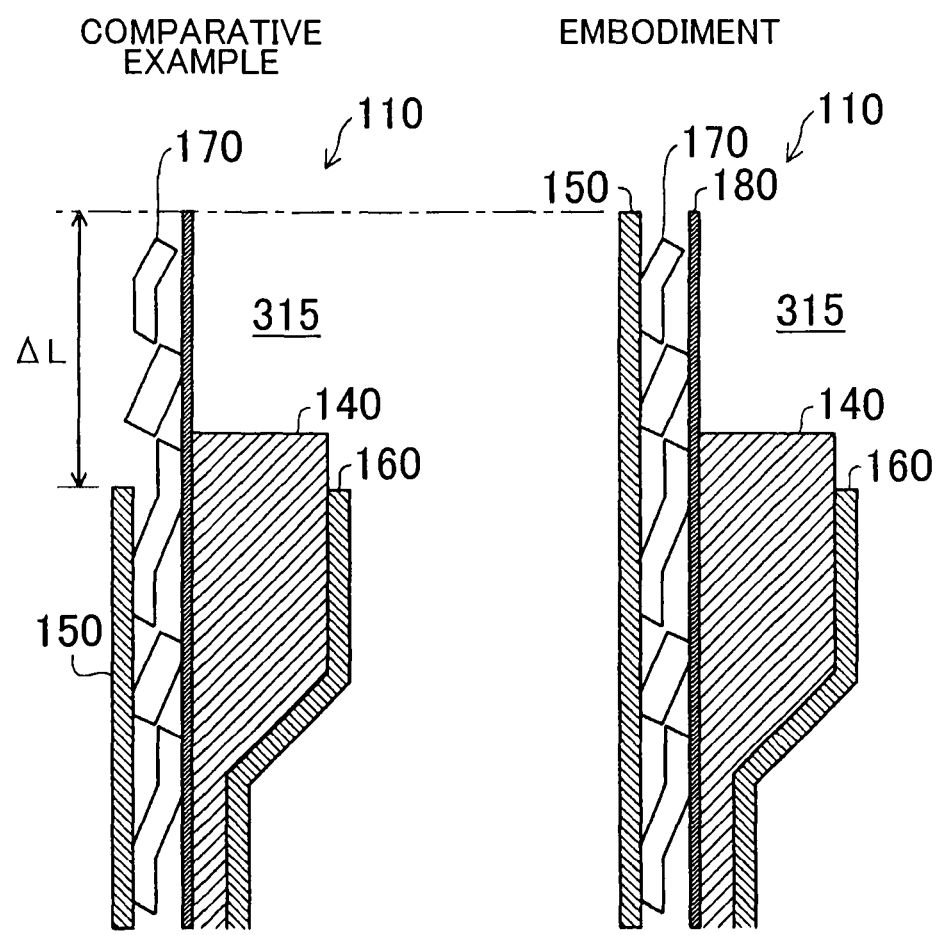
FIG. 4 is an explanatory view illustrating that part of the power generating unit which is close to the oxidant exhaust gas discharge manifold in an enlarged manner.

FIG. 4 is an explanatory view illustrating that part of the power generating unit 100 which is close to the oxidant exhaust gas discharge manifold 315 in an enlarged manner. Herein, two structures of the present embodiment and a comparative example are illustrated. The present embodiment and the comparative example are common in that the porous body flow path 170 and the shielding plate 180 project into the oxidant exhaust gas discharge manifold 315. However, in the present embodiment, the cathode-side separator plate 150 and the shielding plate 180 project into the oxidant exhaust gas discharge manifold 315 only by the same length as the porous body flow path 170, and both surfaces of the porous body flow path 170 are covered with the cathode-side separator plate 150 and the shielding plate 180. In contrast, in the comparative example, the cathode-side separator plate 150 does not project into the oxidant exhaust gas discharge manifold 315, which is different from the present embodiment.

Figure 5:
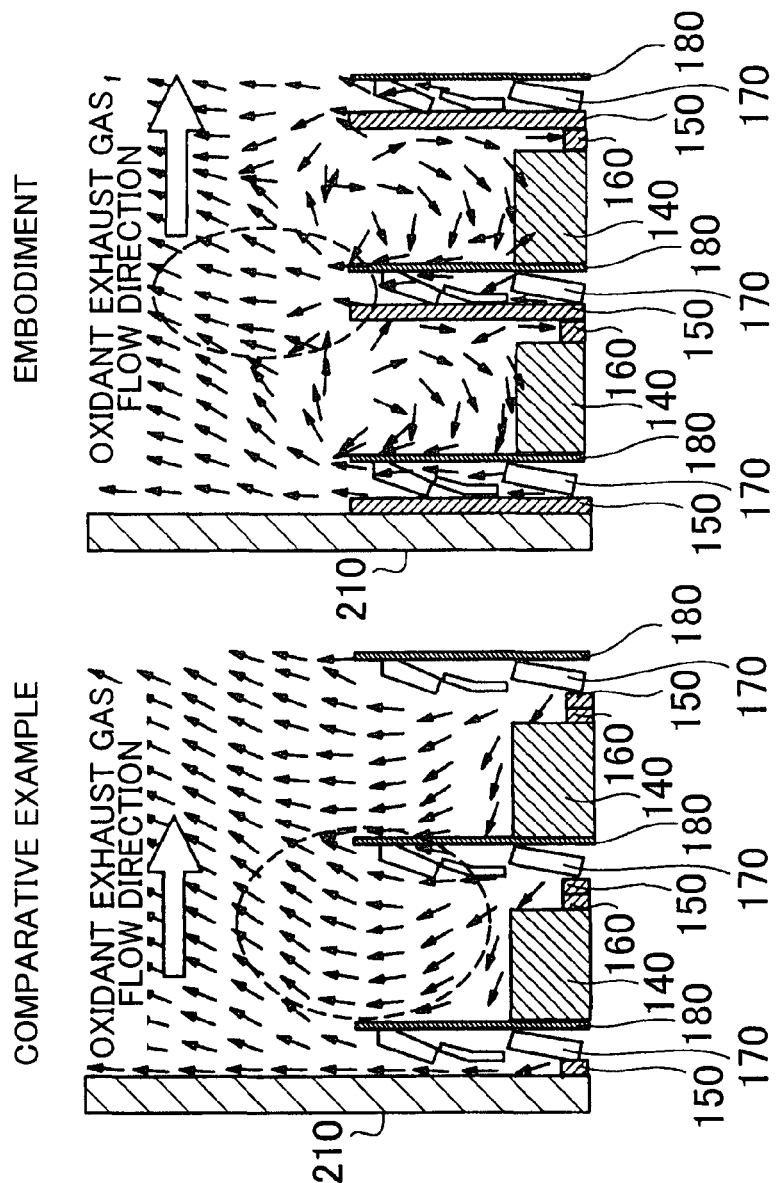
FIG. 5 is an explanatory view showing a simulation result indicative of a flow direction of oxidant exhaust gas in a comparative example and in the present embodiment.

FIG. 5 is an explanatory view showing a simulation result indicative of a flow direction of oxidant exhaust gas of the comparative example and the present embodiment. In the present embodiment, since both surfaces of the porous body flow path 170 are covered with the shielding plate 180 and the cathode-side separator plate 150, directions of oxidant exhaust gas and generated water discharged from the porous body flow path 170 are generally vertical to a flow direction of oxidant exhaust gas flowing through the oxidant exhaust gas discharge manifold 315. In contrast, in the comparative example, since part of a surface of the porous body flow path 170 on a cathode-side-separator-plate-150 side is not covered with the cathode-side separator plate 150, oxidant exhaust gas and generated water discharged from the porous body flow path 170 flow not only in a direction generally vertical to the flow direction of oxidant exhaust gas flowing through the oxidant exhaust gas discharge manifold 315, but also in a direction reverse to the flow direction of the oxidant exhaust gas flowing through the oxidant exhaust gas discharge manifold 315.

Figure 6:
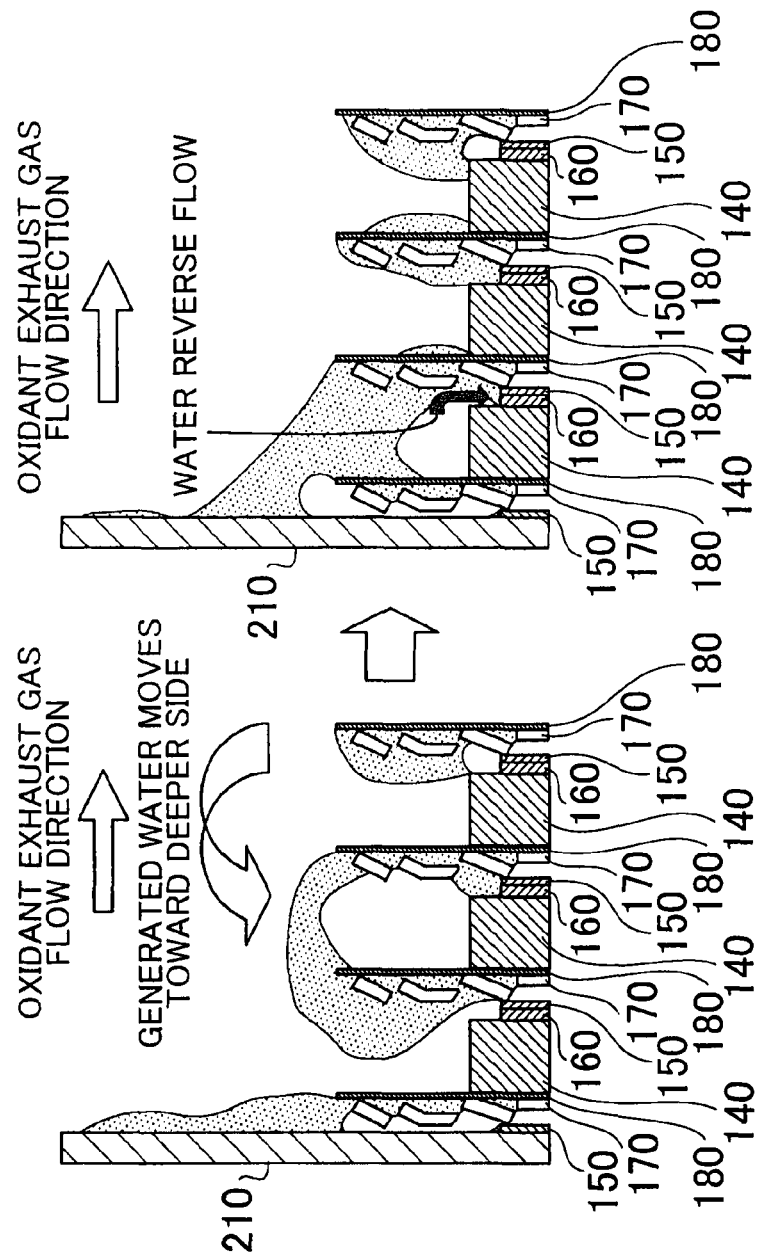
FIG. 6 is an explanatory view showing a distribution of generated water in that part of the oxidant exhaust gas discharge manifold which is close to the terminal plate, in the comparative example.

FIG. 6 is an explanatory view showing a distribution of the generated water in that part of the oxidant exhaust gas discharge manifold 315 which is close to the terminal plate 210, in the comparative example. As described above, in the comparative example, since the oxidant exhaust gas and the generated water discharged from the porous body flow path 170 also flow in the direction reverse to the flow direction of the oxidant exhaust gas flowing through the oxidant exhaust gas discharge manifold 315, the generated water are accumulated and retained on a deeper side of the oxidant exhaust gas discharge manifold 315, namely, near the terminal plate 210, as indicated by an arrow on the left side in FIG. 6. Here, when a load to the fuel cell 10 (FIG. 1) is decreased and a flow rate of the oxidant gas is decreased, the generated water (hereinafter also referred to as "retained water") thus retained functions as a cover relative to the oxidant exhaust gas discharged from the porous body flow path 170, so as to obstruct the discharge of the oxidant exhaust gas. As a result, a pressure loss of the oxidant gas increases. This results in that the oxidant gas is hard to be supplied to the power generating unit 100 on a deeper side. Further, a contacting portion between the retained water and the porous body flow path 170 is large, and therefore, when the supply of the oxidant gas to the fuel cell 10 stops, the retained water is easy to flow backward to the porous body flow path 170.

Figure 7:
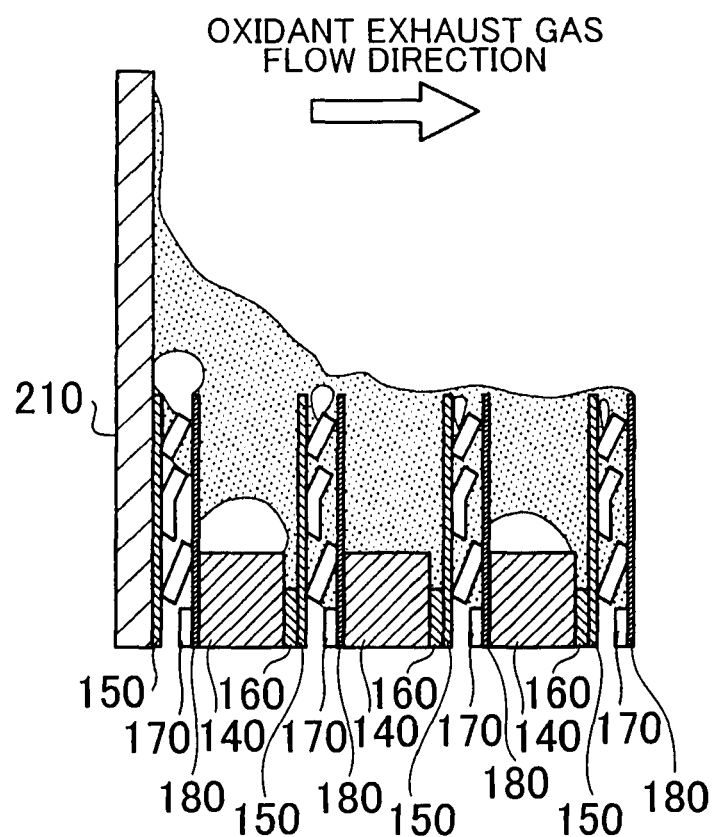
FIG. 7 is an explanatory view showing a distribution of generated water in that part of the oxidant exhaust gas discharge manifold which is close to the terminal plate in the present embodiment.

FIG. 7 is an explanatory view showing a distribution of the generated water in that part of the oxidant exhaust gas discharge manifold 315 which is close to the terminal plate 210, in the present embodiment. Since there is almost no retained water in an oxidant-exhaust-gas outlet portion of the porous body flow path 170, even if there is retained water in the other parts, the retained water is hard to act like a cover. Further, since a contacting portion between the retained water and the porous body flow path 170 is small, even if the supply of the oxidant gas to the fuel cell 10 stops, the retained water is hard to flow backward to the porous body flow path 170.

Figure 8:
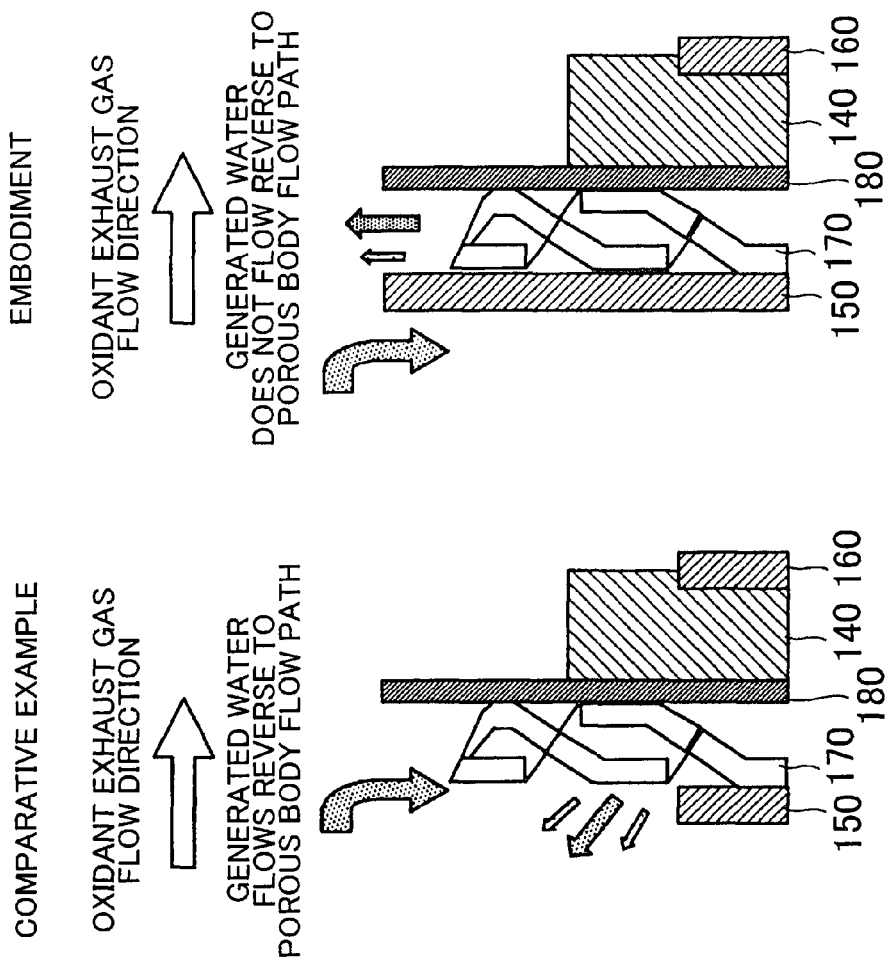
FIG. 8 is an explanatory view to briefly compare flows of generated water of the present embodiment and the comparative example.

FIG. 8 is an explanatory view to briefly compare flows of the generated water of the present embodiment and the comparative embodiment. In the present embodiment, the oxidant exhaust gas and the generated water are discharged in a direction (an up-down direction in FIG. 8) along a longitudinal direction of the porous body flow path 170. In contrast, in the comparative example, the oxidant exhaust gas and the generated water are discharged toward an intermediate direction between the direction along the longitudinal direction of the porous body flow path 170 and a direction toward an upstream of the oxidant exhaust gas discharge manifold 315. Note that, in the present embodiment, the retained water (the generated water) is accumulated in a recessed portion between the cathode-side separator plate 150 and the shielding plate 180 as illustrated in FIG. 7. However, the retained water hardly makes contact with the porous body flow path 170, so the retained water is hard to flow backward to the porous body flow path 170. In contrast, in the comparative example, as illustrated in FIG. 6, the retained water (the generated water) is accumulated in a recessed portion between the porous body flow path 170 and the shielding plate 180, so as to make contact with the porous body flow path 170, and thus, it can be said that the retained water is easy to flow backward to the porous body flow path 170.

Figure 9:
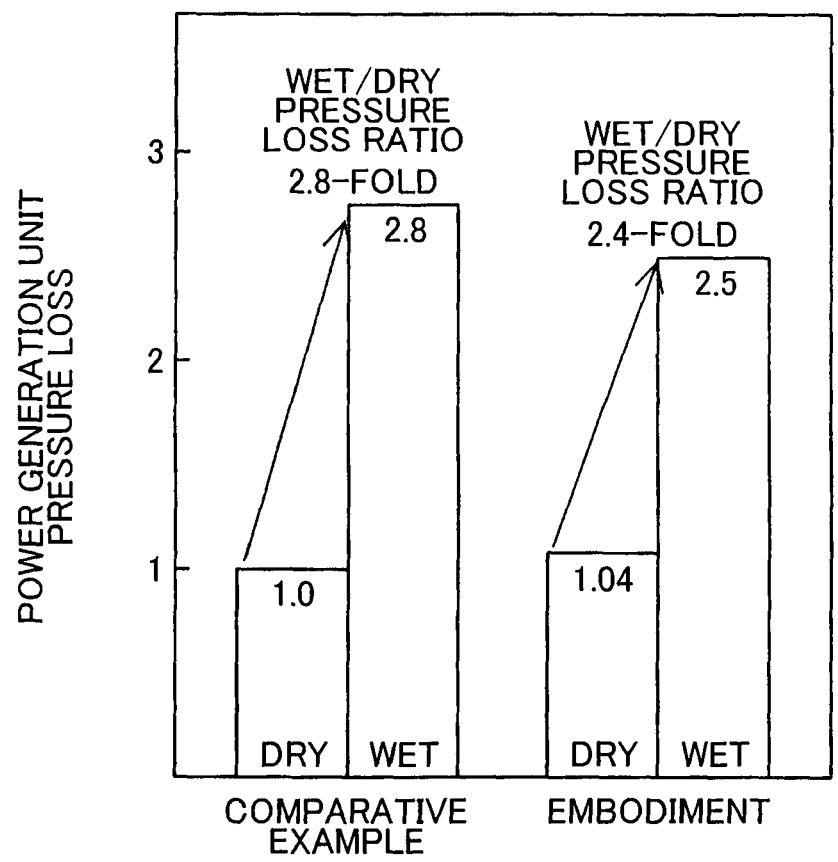
FIG. 9 is a graph showing a pressure loss of the power generating unit.

FIG. 9 is a graph showing a pressure loss of the power generating unit 100. Note that, in FIG. 9, the pressure loss is indicated by use of a ratio when the pressure loss is 1.0 in a dry state of the comparative example. Further, many power generating units 100 are provided in the fuel cell 10, but a value in the graph is a mean value. "Dry" indicates a state where oxidant gas is flowed in a state where no electric power is generated in the fuel cell 10, that is, in a state where no generated water is generated. "Wet" indicates a state where oxidant gas is flowed in a state where electric power is generated in the fuel cell 10 at a maximum current amount, that is, in a state where a generation amount of the generated water is maximum. When the fuel cell 10 is provided in a vehicle or the like for use, the fuel cell 10 is operated in a state between the dry state and the wet state.

Generally, on an inlet side of the oxidant gas supply manifold 310, the oxidant gas is easy to enter the power generating unit 100. However, on a far end side of the terminal plate 210, the oxidant gas is hard to enter the power generating unit 100 due to the pressure loss. Particularly, in the wet state, the pressure loss on the inlet side is not so different from the dry state. However, on the far end side of the terminal plate 210, the pressure loss is further increased due to the generated water, so the oxidant gas is hard to enter the power generating unit 100 due to the pressure loss. Accordingly, the pressure loss is larger in the wet state than the dry state.

As described above, in a vehicle, the fuel cell 10 is operated in a state between the dry state and the wet state. On that account, it is preferable that the pressure loss be reduced in the wet state where the pressure loss is large. When the pressure loss is 1.0 in the dry state in the comparative example, the pressure loss in the wet state in the comparative example is 2.8, and the pressure loss in the wet state in the present embodiment is 2.5. As such, the present embodiment is more preferable than the comparative example.

Further, it is also preferable that a wet/dry pressure loss ratio be small for the following reason. For example, in an operational state in a case where the fuel cell 10 is operated at a high temperature, the fuel cell 10 dries due to the high temperature, so the operation state at this time is close to an operation state in the dry state. Here, when the vehicle stops and moves slowly so as to enter a car park or the like, the temperature of the fuel cell 10 decreases, so the operation state is changed from the dry state to the wet state. In this case, the power generating units 100 do not enter the same wet state. Here, if the pressure loss ratio between the dry state and the wet state is large, a gas supply state of each of the power generating units 100 is largely changed between these two states, so effective power generation might be obstructed. Accordingly, it is preferable that the wet/dry pressure loss ratio be small. The wet/dry pressure loss ratio is 2.8 in the comparative example, whereas the wet/dry pressure loss ratio is 2.4 in the present embodiment, so the present embodiment is more preferable than the comparative example.

Figure 10:
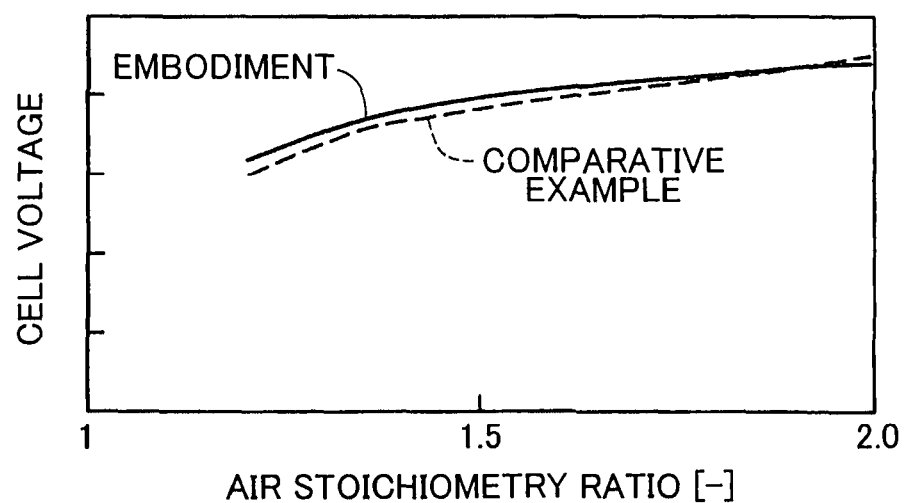
FIG. 10 is an explanatory view showing an air stoichiometry ratio and a voltage (a cell voltage) of the power generating unit.

FIG. 10 is an explanatory view showing an air stoichiometry ratio and a voltage (cell voltage) of the power generating unit 100. In the present embodiment, a voltage of the power generating unit 100 at the time when a given current flows through the power generating unit 100 is measured. Here, the air stoichiometry ratio indicates a ratio of an oxidant gas amount to flow through the power generating unit 100 relative to a necessary oxidant gas amount to flow a given current through the power generating unit 100. For example, when the air stoichiometry ratio is 2, oxidant gas having an amount twice as much as the necessary oxidant gas amount to flow a given current through the power generating unit 100 is flowed through the power generation unit. Here, the influence by the retention of the generated water easily occurs on a low air stoichiometry ratio side with a small flow rate of the oxidant gas. In a region where the air stoichiometry ratio is low, the cell voltage is higher in the present embodiment than in the comparative example, so it may be said that the present embodiment is effective.

As described above, in the present embodiment, the porous body flow path 170, the cathode-side separator plate 150, and the shielding plate 180 project into the oxidant exhaust gas discharge manifold defined by the frame 140, so there is almost no retained water in the oxidant-exhaust-gas outlet portion of the porous body flow path 170, and the retained water is hard to act like a cover. Further, since the contacting portion between the retained water and the porous body flow path 170 is small, even if the supply of the oxidant gas to the fuel cell 10 stops, the retained water is hard to flow backward to the porous body flow path 170. As a result, the generated water is easy to be discharged, thereby making it possible to restrain a decrease of power generation performance in the wet state.

FIGS. 11A to 11C are explanatory views showing a part of a modification of the present embodiment. In FIG. 11A, a porous body flow path 170, a cathode-side separator plate 150, and a shielding plate 180 project into an oxidant exhaust gas discharge manifold defined by a frame 140, which is common with the present embodiment. However, a projection amount of the shielding plate 180 is smaller than a projection amount of the porous body flow path 170. As a result, the shielding plate 180 covers that part of the porous body flow path 170 which is closer to an end surface 140a of the frame 140, but does not cover an end (an upper side in FIG. 11A) of the porous body flow path 170. In this modification, oxidant exhaust gas and generated water are discharged toward an intermediate direction between a direction along a longitudinal direction of the porous body flow path 170 and a direction toward a downstream of an oxidant exhaust gas discharge manifold 315. Hereby, the generated water is discharged smoothly without flowing backward.

In FIG. 11B, a porous body flow path 170, a cathode-side separator plate 150, and a shielding plate 180 are placed in the same manner as in the present embodiment, but the shielding plate 180 includes many holes 181, which is different from the present embodiment. In this modification, oxidant exhaust gas and generated water are discharged in a direction along a longitudinal direction of the porous body flow path 170, similarly to the present embodiment, and further discharged from the holes 181 of the shielding plate 180 in a downstream direction of the flow of the oxidant exhaust gas. Hereby, the generated water is discharged easily outside a fuel cell 10 without flowing backward. Note that slits may be employed instead of the holes 181, provided that the generated water is dischargeable therefrom.

In FIG. 11C, a porous body flow path 170, a cathode-side separator plate 150, and a shielding plate 180 are configured to project into an oxidant exhaust gas discharge manifold 315 defined by a frame 140, which is common with the present embodiment, but projection amounts of the shielding plate 180 and the cathode-side separator plate 150 are smaller than a projection amount of the porous body flow path 170. That is, that part of the porous body flow path 170 which is closer to an end surface 140a of the frame 140 are covered with the cathode-side separator plate 150 and the shielding plate 180, but an end (an upper side in FIG. 11C) of the porous body flow path 170 is not covered with the shielding plate 180 and the cathode-side separator plate 150. In this modification, oxidant exhaust gas and generated water are discharged in a direction along a longitudinal direction of the porous body flow path 170, similarly to the present embodiment. When retained water exists, the retained water is accumulated between the cathode-side separator plate 150 and the shielding plate 180 as illustrated on the right side in FIG. 6 or in FIG. 7. Even in this modification, similarly to the present embodiment illustrated in FIG. 7, the porous body flow path 170 is hard to make contact with the retained water, so the retained water is hard to act like a cover. Further, even if the supply of the oxidant gas to the fuel cell 10 stops, the retained water is hard to flow backward to the porous body flow path 170. It is preferable that the projection amounts of the shielding plate 180 and the cathode-side separator plate 150 have the same projection amounts, or the cathode-side separator plate 150 provided in an upstream of the flow of the oxidant exhaust gas project more than the shielding plate 180, provided that the projection amounts of the shielding plate 180 and the cathode-side separator plate 150 are smaller than the projection amount of the porous body flow path 170. It is preferable that the following relationship be satisfied, "the projecting amount of the porous body flow path 170>the projecting amount of the cathode-side separator plate 150≥the projecting amount of the shielding plate 180." Note that the shielding plate 180 may project more than the cathode-side separator plate 150.

In the above embodiment, a cathode side of the power generating unit 100 is placed in the upstream of the flow of the oxidant exhaust gas discharge manifold 315, and an anode side thereof is placed in the downstream of the flow of the oxidant exhaust gas discharge manifold 315, but a relationship of the cathode and the anode may be reverse to the above. In this case, in the example corresponding to FIG. 11A of the modification, the projection amount of the cathode-side separator plate 150 should be smaller than the projection amounts of the porous body flow path 170 and the shielding plate 180. Further, in the example corresponding to FIG. 11B of the modification, openings should be provided in the cathode-side separator plate 150.

As can be understood from the above embodiment and various modifications, it is preferable that the shielding plate 180, the porous body flow path 170, and the cathode-side separator plate 150 project into the oxidant exhaust gas discharge manifold 315 defined by the frame 140.

The embodiment of the present invention has been described above based on some examples, but the above embodiment of the present invention is intended to facilitate understanding of the present invention, and not to limit the present invention. The present invention can be altered or modified without departing from the gist and the scope of claims, and further, it is needless to say that the present invention includes its equivalent.

The invention claimed is:

1. A fuel cell comprising a plurality of power generating units laminated,
   each of the power generating units including:
      a membrane electrode gas diffusion layer assembly including an electrolyte membrane, an anode-side catalytic layer, and a cathode-side catalytic layer such that the electrolyte membrane is sandwiched between the anode-side catalytic layer and the cathode-side catalytic layer;
      a sealing portion disposed along an outer circumference of the membrane electrode gas diffusion layer assembly;
      a porous body flow path disposed so as to be opposed to the cathode-side catalytic layer and in which oxidant gas supplied to the cathode-side catalytic layer flows;
      a shielding plate provided between the sealing portion and the porous body flow path; and
      first and second separator plates configured to sandwich the membrane electrode gas diffusion layer assembly and the porous body flow path there between,
   wherein the sealing portion and the first and second separator plates have openings at positions corresponding to each other,
   the openings communicate with each other when the plurality of power generating units is laminated, so as to form an oxidant exhaust gas discharge manifold through which oxidant exhaust gas is discharged from the porous body flow path,
   the first separator plate makes contact with the porous body flow path, and
   the shielding plate, the porous body flow path, and the first separator plate project into the oxidant exhaust gas discharge manifold defined by the sealing portion.

2. The fuel cell according to claim 1, wherein:
   both surfaces of that part of the porous body flow path which project into the oxidant exhaust gas discharge manifold are covered with the shielding plate and the first separator plate.

3. The fuel cell according to claim 1, wherein:
   one of the shielding plate and the first separator plate which is disposed in a downstream in a flow direction of the oxidant exhaust gas in the oxidant exhaust gas discharge manifold has a smaller projection amount to project into the oxidant exhaust gas discharge manifold, than the other one thereof which is disposed in an upstream in the flow direction.

4. The fuel cell according to claim 1, wherein:
   the porous body flow path projects into the oxidant exhaust gas discharge manifold more than the shielding plate and the first separator plate.

5. The fuel cell according to claim 1, wherein:
   one of the shielding plate and the first separator plate which is disposed in a downstream in a flow direction of the oxidant exhaust gas in the oxidant exhaust gas discharge manifold includes holes or slits configured to communicate the oxidant exhaust gas discharge manifold with the porous body flow path.

* * * * *